(12) United States Patent
Steiner et al.

(10) Patent No.: US 11,501,346 B2
(45) Date of Patent: Nov. 15, 2022

(54) SYSTEM AND METHOD FOR FACILITATING SEAMLESS COMMERCE

(71) Applicant: Toshiba Global Commerce Solutions Holdings Corporation, Tokyo (JP)

(72) Inventors: David John Steiner, Raleigh, NC (US); Wan-Chen Tsai, Taipei (TW); Vinessia Hankins, Raleigh, NC (US); William Larry Vaught, Creedmoor, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 92 days.

(21) Appl. No.: 16/365,142

(22) Filed: Mar. 26, 2019

(65) Prior Publication Data
US 2020/0311788 A1 Oct. 1, 2020

(51) Int. Cl.
*G06Q 30/06* (2012.01)
*H04W 4/35* (2018.01)
*H04W 4/024* (2018.01)

(52) U.S. Cl.
CPC ..... *G06Q 30/0609* (2013.01); *G06Q 30/0635* (2013.01); *H04W 4/024* (2018.02); *H04W 4/35* (2018.02)

(58) Field of Classification Search
None
See application file for complete search history.

(56) References Cited

U.S. PATENT DOCUMENTS

| 7,780,081 B1 * | 8/2010 | Liang ............... G06Q 30/0633 235/383 |
| 8,135,624 B1 | 3/2012 | Ramalingam et al. |
| 9,311,645 B2 | 4/2016 | Edwards et al. |
| 9,786,000 B2 | 10/2017 | Herring et al. |
| 9,940,663 B2 | 4/2018 | Ward et al. |
| 9,978,086 B1 | 5/2018 | Madden |
| 10,074,084 B1 | 9/2018 | Jhaveri et al. |

(Continued)

OTHER PUBLICATIONS

J. Li, I. Ari, J. Jain, A. H. Karp and M. Dekhil, "Mobile In-store Personalized Services," 2009 IEEE International Conference on Web Services, 2009, pp. 727-734, doi: 10.1109/ICWS.2009.107. (Year: 2009).*

(Continued)

*Primary Examiner* — Michelle T Kringen
(74) *Attorney, Agent, or Firm* — Coats & Bennett, PLLC

(57) ABSTRACT

Customers are identified as they enter a store and linked to one or more items previously ordered on-line. A route through the store to retrieve the ordered items is generated and sent to the customer's mobile device for display. The customer's movements are tracked as he/she goes through the store to retrieve products, and the location of the customer determined whenever he/she selects a product from the shelves. Based on whether the locations of the customer when he/she selected the products matches the predefined locations of the items ordered on-line, the customer is directed to go to one of an audit station or checkout lane, or alternatively, to bypass both audit station and the checkout lane and exit the store. In the latter case, the customer's account is automatically charged for the total cost of the ordered items.

20 Claims, 7 Drawing Sheets

(56) References Cited

U.S. PATENT DOCUMENTS

| | | | |
|---|---|---|---|
| 2009/0125406 A1* | 5/2009 | Lewis | G07G 1/0054 |
| | | | 705/23 |
| 2012/0271712 A1 | 10/2012 | Katzin et al. | |
| 2013/0282533 A1 | 10/2013 | Foran-Owens et al. | |
| 2014/0006195 A1 | 1/2014 | Wilson | |
| 2014/0214608 A1* | 7/2014 | Pedley | G06Q 30/0643 |
| | | | 705/26.35 |
| 2016/0110700 A1 | 4/2016 | Brosnan et al. | |
| 2016/0110786 A1* | 4/2016 | Herring | G06F 3/013 |
| | | | 705/26.35 |
| 2016/0189277 A1* | 6/2016 | Davis | B62B 5/0096 |
| | | | 705/26.8 |
| 2016/0232515 A1 | 8/2016 | Jhas et al. | |
| 2018/0154918 A1* | 6/2018 | Hannah | B62B 3/1412 |
| 2018/0232796 A1* | 8/2018 | Glaser | G06Q 30/0641 |

OTHER PUBLICATIONS

Daniels, J., "Amazon's Grab-and-Go Stores to Pressure Grocers to Step-up 'Smart Store' Efforts", Dec. 5, 2016, pp. 1-6, retrieved on Nov. 28, 2018, retrieved from internet: www.cnbc.com/2016/12/09/amazons-grab-and-go-stores-to-pressure-grocers-to-step-up-smart-store-efforts.html.

Boden, R., "Barclaycard trials shopping app that lets customers use their smartphone as 'pocket checkout'" NFC World, May 30, 2017, pp. 1-7, obtained on Nov. 28, 2018, obtained from internet: https://www.nfcworld.com/2017/05/30/352868/barclaycard-trials-shopping-app-lets-customers-use-smartphone-pocket-checkout/.

Bowles, N., "Stealing From a Cashierless Store (Without You, or the Cameras, Knowing It)", The New York Times, Sep. 13, 2018, pp. 1-7, retrieved on Nov. 29, 2018, retrieved from internet: https://www.nytimes.com/2018/09/13/technology/standard-market-retail-automation-behavioral-data.html.

\* cited by examiner

PROCESSING CIRCUITRY
110

COMMUNICATIONS UNIT/MODULE
120

CUSTOMER IDENTIFICATION UNIT/MODULE
122

CUSTOMER TRACKING UNIT/MODULE
124

COMPARISON/VERIFICATION UNIT/MODULE
126

AUDIT DETERMINATION UNIT/MODULE
128

CONTROL MESSAGE GENERATION UNIT/MODULE
130

FIG. 7

SYSTEM AND METHOD FOR FACILITATING SEAMLESS COMMERCE

TECHNICAL FIELD

The present disclosure relates generally to seamless commerce, and more particularly to systems and methods for providing a seamless commerce experience to customers.

BACKGROUND

"Seamless commerce," also referred to as "omnichannel retailing," optimizes the different channels a merchant uses to sell goods. By way of example, some grocery stores now provide a service in which customers select items for purchase on-line. In some cases, the customer can also pay for the items on-line. Upon receipt of the order, a store employee retrieves the items from the shelves and places them into a holding area for the customer. Once the customer arrives at the store, the employee retrieves the items from the holding area and places them into the customer's vehicle. The customer can then provide feedback regarding their shopping experience to the store and others, if they so choose, via social media.

Omnichannel retailing provides customers with a "seamless commerce experience" such that customers can shop in any manner they choose (e.g., using their home computers, mobile devices, tablets, or in-store) and feel that their experience is consistent throughout all channels. Merchants are increasingly beginning to realize how desirable a "seamless commerce experience" is to customers, as well as how profitable providing such an experience can be.

BRIEF DESCRIPTION OF THE DRAWINGS

FIG. 7 is a functional block diagram illustrating a computer program product configured to control a computer to provide customers with a seamless commerce experience according to one embodiment of the present disclosure.

DETAILED DESCRIPTION

A fundamental goal of omnichannel retailing is to provide customers with a "seamless commerce experience." To accomplish this function, some solutions integrate the various channels retailers use to sell their products to the public. Such so-called "channels" may include, but are not limited to, the physical location of a store, any eCommerce solutions the store provides (e.g., on-line ordering), any mobile applications associated with the store, websites, email communications, product delivery channels, and the store's social media presence. In some cases, one or more of these channels are interactive.

Omnichannel retailing, when done correctly, makes customers feel that their shopping experience is consistent and pleasant across the various channels. That is, customers can shop the same way using a mobile application or website as they would if they were in the store. However, fully implementing an omnichannel retailing solution is heavily dependent on technology. Therefore, such solutions typically require a large investment in infrastructure. Embodiments of the present disclosure, however, provide a solution in which large infrastructure investments are not required. Rather, the present embodiments provide a system that extends the current infrastructure of a retail establishment, thereby allowing the retail establishment to enhance the seamless commerce experience it provides to customers.

By way of example, many brick and mortar retail establishments already implement cameras and other video equipment for a variety of reasons. Chief among them is security, but they can also be used to identify people entering and exiting the store. Additionally, many stores have a website presence and/or mobile applications where customers can select and purchase products. The present embodiments utilize this infrastructure to allow customers to select one or more products on-line, and then subsequently retrieve the selected products from the store without having to wait in line at a checkout station to pay for the selected products.

Figure 1:
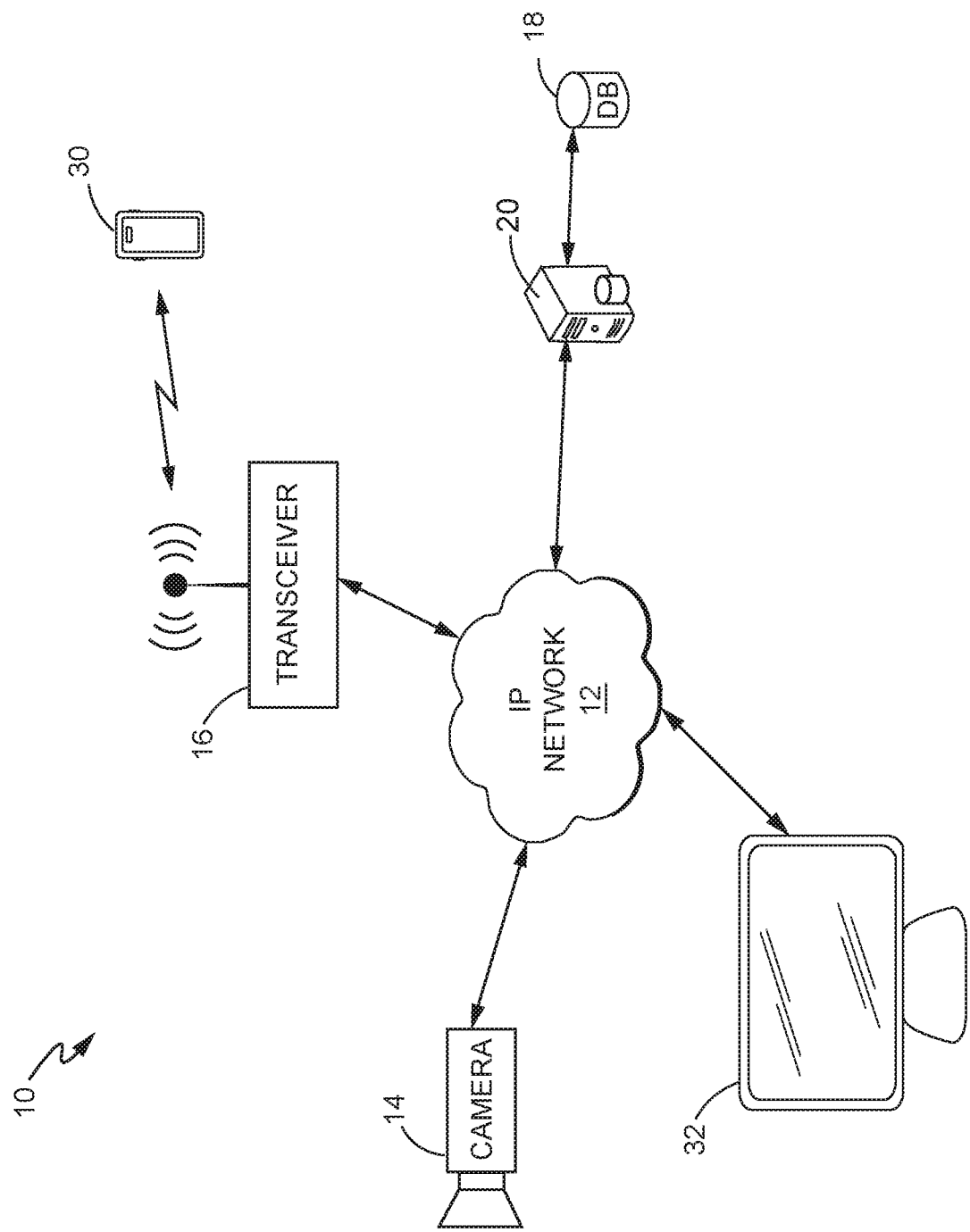
FIG. 1 is a functional block diagram illustrating a system configured to provide customers with a seamless commerce experience according to one embodiment of the present disclosure.

Turning now to the drawings, FIG. 1 is a functional block diagram illustrating a system 10 configured to provide customers with a seamless commerce experience according to one embodiment of the present disclosure. It should be noted that system 10, its components, and their functions are discussed herein as if system 10 was associated with a grocery store. However, this is for illustrative purposes only. Those of ordinary skill in the art will readily appreciate that system 10 can be associated with any type of retail establishment having a presence at a physical location. Further, those of ordinary skill in the art will understand that not all of the components comprising system 10 need to be disposed in the store. In some embodiments, for example, one or more of the components comprising system 10 may be located remotely from the store.

Regardless, this embodiment of system 10 comprises an IP network 12 communicatively interconnecting one or more cameras 14, a short-range wireless transceiver 16, and one or more computer servers 20 that may, in some embodiments, be operatively connected to a database (DB) 18. Additionally, as described in more detail later, a user application executing on a customer's mobile device 30 and/or a customer's home-based personal computer (PC) 32, communicates with the components of system 10 to facilitate customer interaction with system 10. More specifically, using mobile device 30 and/or PC 32, customers can utilize a website associated with the store to select and order items for subsequent pick-up from the store.

The IP network 12 may comprise any private or public data network known in the art, such as the Internet, for example, but is capable of communicating packets of data utilizing the well-known Internet Protocol (IP). Such data includes, as described in more detail below, image data captured by the one or more cameras 14, as well as the commands, signals, and data required for computer server 20 to perform it's functions.

Cameras 14 may comprise any camera known in the art capable of capturing video imagery and/or still images, and then communicating those captured images to computer server 20. For example, in one embodiment, cameras 14 comprise a network of security cameras already existing at a brick-and-mortar retail establishment. Used conventionally, cameras 14 output captured images to corresponding display devices where a human operator (e.g., a store employee) scans the images in real time. Alternatively, cameras 14 output the captured images to one or more recording devices for subsequent review by a human operator. According to embodiments of the present disclosure, however, the functionality of cameras 14 is extended from typical security operation to identify customers as they enter and exit the store, as well as the locations in the store the customer goes to when retrieving a selected product from a shelf in the store. As described in more detail below, the determined locations are utilized by system 10 to verify whether the customer should or should not be audited before exiting the store.

Transceiver 16 is configured to send and receive communication signals and data with a customer's mobile device 30 when the customer enters and exits the store, and to communicate those events with computer server 20. Additionally, transceiver 16 communicates control messages to the customer's mobile device 30 to control the functionality of the mobile device 30. As stated above, in one embodiment, the control messages comprise data identifying a route that the customer should take through the store to retrieve the items that were ordered on-line. In another embodiment, the control messages comprise data controlling mobile device 30 to indicate how the customer should exit the store. For example, the control messages can comprise data controlling mobile device 30 to graphically indicate whether the customer should proceed to an audit station or checkout lane before exiting the store, or whether the customer can bypass both the audit station and the checkout lane and simply exit the store. To that end, transceiver 16 comprises circuitry configured to communicate in accordance with any of a variety of well-known protocols. Such protocols include, but are not limited to, Near Field Communications (NFC), BLUETOOTH, RFID, WiFi, and the like.

Computer server 20, as described in more detail below, may communicatively connect to, or comprise, one or more databases (DBs) 18. In one embodiment, DB 18 is configured to store image data associated with the products offered for sale by the store. Such data includes, but is not limited to, data used for image analysis, user profile data (e.g., loyalty card data for customers), pricing data, sale data, as well as an indicator or other identifier that uniquely identifies the specific location of the products within the store.

As described later in more detail, computer server 20 receives signals from transceiver 16 via IP network 12 indicating when the customer enters and exits the store. In addition, computer server 20 receives images of customers retrieving products from cameras 14 via IP network 12. Computer server 20 also has access to information identifying the in-store location of each item the customer ordered on-line. Based on the image data stored in DB 18, computer server 20 can analyze the captured images to determine whether the customer is or is not in an expected location of the store when retrieving the product from the shelves. Based on the determined location, computer server 20 can then identify whether the product retrieved by the customer is one of the items ordered on-line by the customer, and determine whether to audit the customer accordingly.

Figure 2:
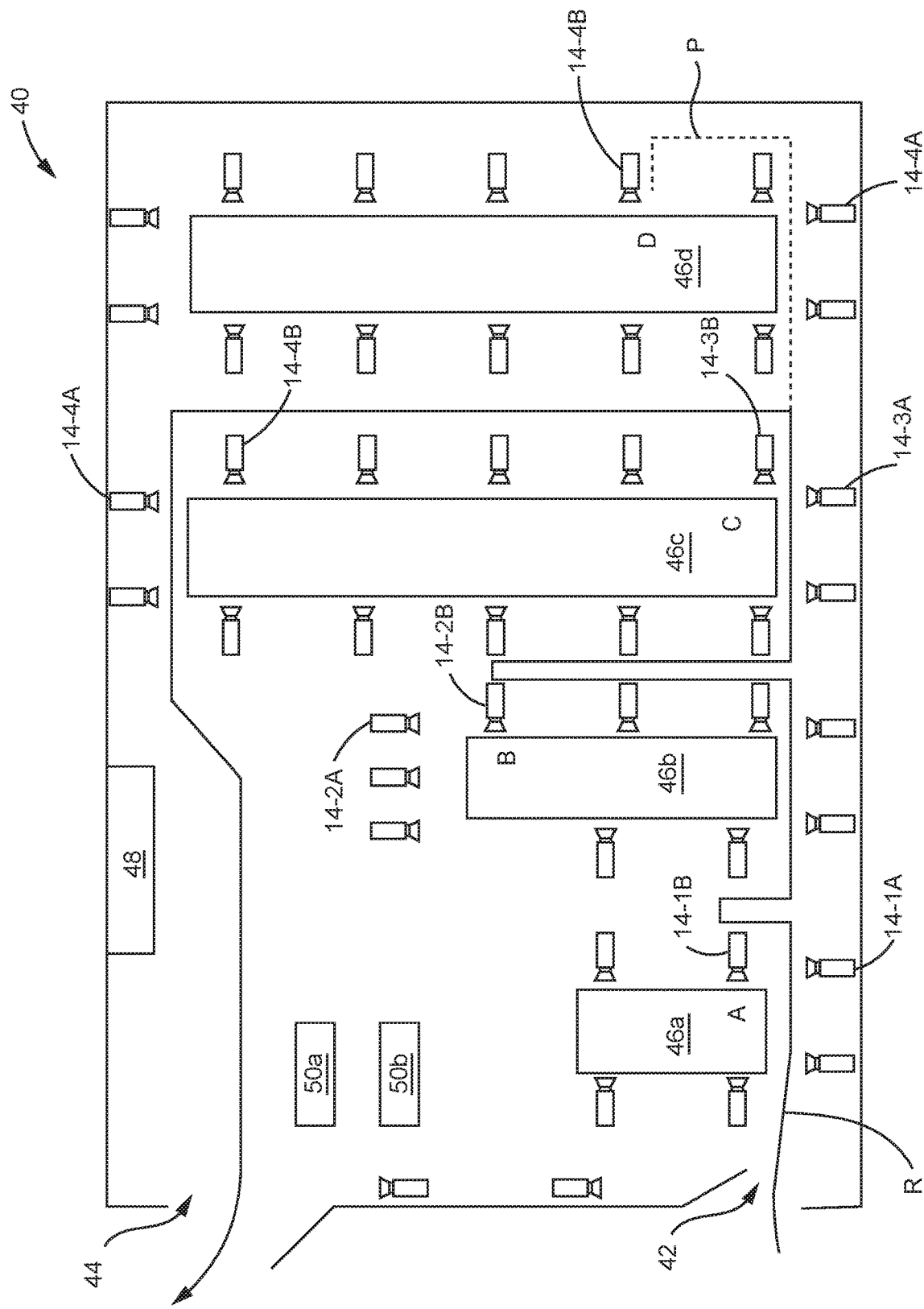
FIG. 2 is a view of a map of the interior of a retail establishment configured to provide customers with a seamless commerce experience according to one embodiment of the present disclosure.

FIG. 2 illustrates a view of a map of the interior layout of a grocery store configured to provide customers with a seamless commerce experience according to one embodiment of the present disclosure. In one embodiment, this diagram, as stated above, comprises a map 40 of the store and is displayed on the customer's mobile device 30 when the customer enters the store to retrieve the items he/she previously selected on-line.

As seen in FIG. 2, map 40 graphically indicates the entrance 42 to, and exit 44 from, the store, respectively, a plurality of shelves 46a . . . 46d (collectively, shelves 46) on which the products are maintained, the location of an audit station 48, and checkout lanes 50a, 50b (collectively, checkout lanes 50). The locations of cameras 14 are also shown in FIG. 2, although they need not be shown on map 40 displayed on mobile device 30.

In this embodiment, the customer first installs a mobile application on his/her mobile device 30 prior to going to the store. Alternatively, however, the customer can also download and install the mobile application on mobile device 30 while the customer is in the store. Once installed, the customer can configure the application with information associated with one or more accounts (e.g., credit cards) to facilitate the automatic payment for retrieved products, as well as various preferences and profile information.

So configured, a user, either the customer or a person associated with the customer (e.g., a spouse), orders products from the grocery store using the either the user application executing on a mobile device 30, or a web site associated with the store and accessed using PC 32. By way of example, consider a scenario where the customer's spouse uses her PC 32 to "pre-order" one (1) loaf of NATURE'S OWN bread, one (1) dozen cage free eggs, and one (1) gallon of NEW HORIZON organic milk. The spouse then telephones her husband (i.e., the customer) at work and asks him to retrieve the items she ordered from the store on his way home. The husband goes to the store, launches the user application on his mobile device 30 and enters the store through entrance 42. Cameras 14 capture images of the customer entering the store and provide those images to computer server 20. Computer server 20, in turn, identifies the husband as being an "authorized user" associated with the order based on an image analysis of captured images, and provides mobile device 30, via transceiver 16, with map 40. As stated previously, map 40 identifies the particular locations of the ordered items on the shelves (designated herein as A, B, C), and indicates a route R that the user must take to retrieve the ordered items A, B, C.

Computer server 20 then uses cameras 14 to monitor the husband's movement through the store. Particularly, cameras 14-1A, 14-1B capture images of the customer when he is at location A, cameras 14-2A, 14-2B capture images of the customer when he is at location B, and cameras 14-3A, 14-3B capture images of the customer when he is at location C. Provided the husband does not deviate from route R and stops only at points A, B, and C to retrieve the items ordered by his spouse, computer server 20 controls mobile device 30 to graphically indicate that the husband can bypass auditing station 48 and checkout lanes 50, and simply exit the store through exit 44. Computer server 20 will then automatically charge the husband's account for the items he retrieved when he exits the store. However, should computer server 20 determine that the husband deviated from the route R (e.g., when cameras 14-4A, 14-4B capture images of the husband when he goes to point D to select or visually inspect a product not ordered by the wife), computer server 20 generates a different control message to control mobile device 30 to indicate that the husband should not exit the store, but rather, should proceed to either the audit station 48 so that a human employee can visually inspect the products retrieved by the husband, and/or to checkout lane 50 so that the husband can pay for product retrieved at point D.

Figure 3:
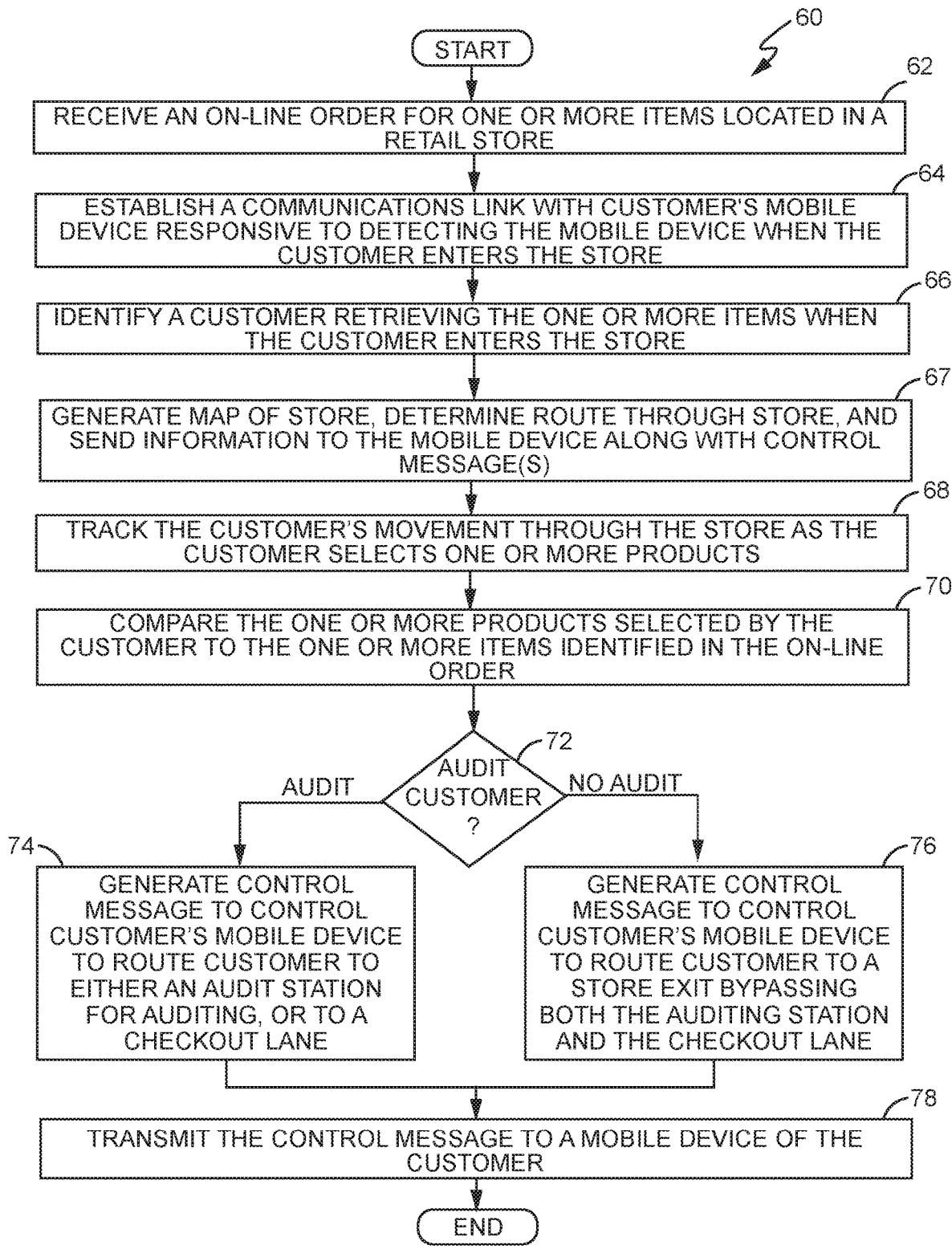
FIG. 3 is a flow chart illustrating a method for providing customers with a seamless commerce experience according to one embodiment of the present disclosure.

FIG. 3 is a flow chart illustrating a method 60 for providing customers with a seamless commerce experience according to one embodiment of the present disclosure. It should be noted that method 60 assumes that the customer has already downloaded and configured user application mobile device 30 as previously stated.

As seen in FIG. 3, method 60 begins with computer server 20 receiving an order for one or more products that are physically located in the store (box 62). The order in this embodiment is made on-line by either the customer or the customer's spouse, for example, without pre-payment for the order. The customer then proceeds to the store and launches the application on mobile device 30. System 10 detects the user entering the store, using, for example, BLUETOOTH discovery, and establishes a wireless communications link (e.g., a BLUETOOTH link) with mobile device 30 (box 64). Methods for detecting BLUETOOTH capable devices, and for establishing communications links with those devices, are well-known and thus, not described in detail here.

Method 60 then calls for identifying the customer who will retrieve the items ordered on-line (box 66). By way of example only, computer server 20 can identify the customer entering the store as the person who will retrieve the items ordered on-line by analyzing one or more images of the customer. The images used in the analysis can be captured as the customer enters the store and sent to the computer server 20 by cameras 14 for processing using any known image analysis software. In particular, the image analysis software can process the captured images and compare the processed images to one or more other "baseline" images of the customer stored in DB 18. In this embodiment, the customer's baseline image is also associated with information, e.g., an order number, assigned to the order when the customer's spouse ordered the items on-line. Provided the captured images match the "baseline" images to within a predetermined confidence threshold, computer server 20 will identify the customer as the person retrieving the ordered items listed on the associated order number.

The identification can, in some embodiments, be based on other information associated with the customer as well as on the results of the image analysis. By way of example only, many stores provide their customers with "loyalty cards." Such cards allow customers to receive discounts on selected products, but can also encode information about the customer that is also stored in DB 18. In some embodiments, the so-called baseline images can also be associated with the loyalty card information stored in DB 18. Thus, computer server 20 can retrieve the loyalty information for a given customer as part of the image analysis process and use that information to determine the identity of the customer as well as to match the customer to the correct on-line order. In such cases, the customer would have been linked to the order at the time of placing the order via, as previously stated, a unique order number or some other order identifier.

In another embodiment, such information is received from the application that is launched by the customer's mobile device 30 when the customer enters the store. In these cases, computer server 20 still determines an identity of the customer based in part on the images captured by cameras 14. In addition, however, identification of the customer can also be based on information about the customer and/or sent by the customer's mobile device 30 once the communications link has been established. Such information includes, but is in no way limited to, the IMSI of mobile device 30 and a unique "loyalty ID" assigned by the store to the customer upon registering his/her loyalty card with the store. In each case, this additional information can be stored in DB 18 and associated with the baseline images of the customer.

Regardless of how the customer is identified, computer server 20 links the customer entering the store to the list of items ordered on-line. Computer server 20 then generates a map 40 of the store, determines a route R for the customer to follow through the store when retrieving the ordered items, and sends information representing the map 40 to mobile device 30 via transceiver 16, as well as one or more control messages that control mobile device 30 to output the map 40 to its display (box 67). Then cameras 14 and computer server 20 track the customer's movements as the user follows route R through the store to retrieve the items ordered on-line (box 68).

As stated above, whether the user deviates from the expected route R is a factor in determining whether the customer should be directed to one or both of audit station 48 and a checkout lane 50, or permitted to bypass both the audit station 48 and the checkout lane 50 and simply exit the store via exit 44. However, the customer's adherence to predefined route R need not be the only factor. According to the present embodiments, cameras 14 are configured to capture images of the customer whenever the customer retrieves a product from the shelving. The computer server 20 then analyzes these images to determine the location of the customer at the time the customer retrieved the product. The determined location is then compared to a set of known locations for each of the items ordered on-line (box 70). In this embodiment, if the determined location does not match any of the known locations associated with the ordered items to within a predefined distance threshold (box 72), the decision is made to audit the customer. In this case, computer server 20 generates one or more control messages to control the customer's mobile device 30 to route the customer to audit station 48 and/or checkout lane 50 (box 74). However, if the determined location matches at least one of the known locations associated with the items ordered on-line to within the predefined distance threshold (box 72), the decision is made to not audit the customer. In this case, computer server 20 generates one or more control messages that cause the customer's mobile device 30 to display the map 40 routing the customer to the store exit 44, and bypassing both the audit station 48 and the checkout lane 50 (box 76). Computer server 20 then transmits the generated control message to the customer's mobile device 30 via transceiver 16 (box 78).

Figure 4:
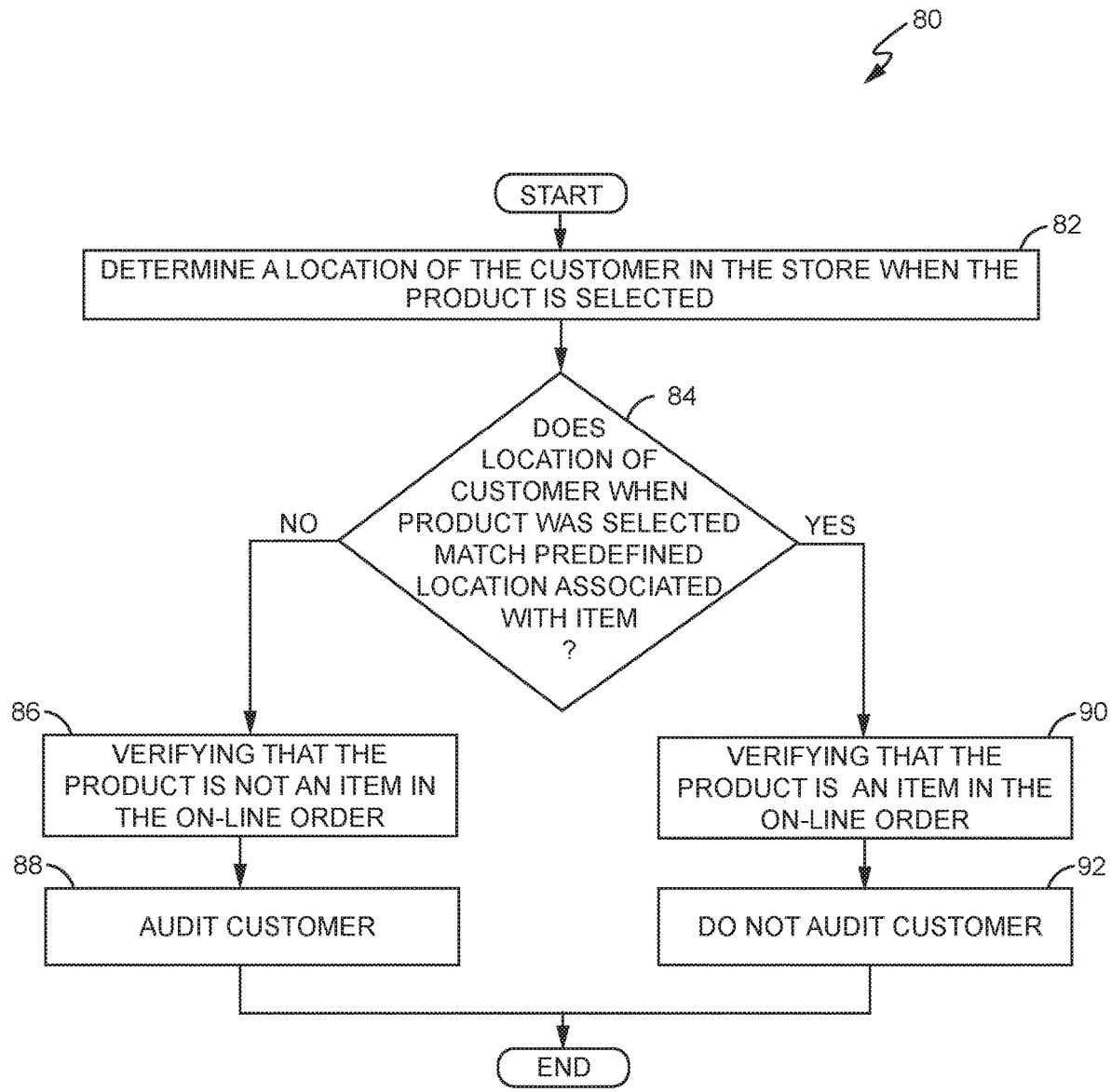
FIG. 4 is a flow chart illustrating a method of determining whether to audit a customer according to one embodiment of the present disclosure.

FIG. 4 is a flow chart illustrating a method 80 of determining whether to audit a customer based on the location of the customer in the store when the customer retrieved products from the shelves according to one embodiment of the present disclosure. Method 80 begins with computer server 20 determining the location of the customer in the store when the customer retrieved the product from the shelves (box 82). That location is then compared to one or more pre-defined locations for the items in the on-line order (box 84). If the customer's determined location does not match one of the predefined locations, computer server 20 verifies that the product retrieved by the customer is not one of the items in the on-line order (box 86) and decides to audit the customer (box 88). If, however, the customer's determined location does match one of the predefined locations, computer server 20 verifies that the product retrieved by the customer is one of the items in the on-line order (box 90) and decides not to audit the customer (box 92).

Figure 5:
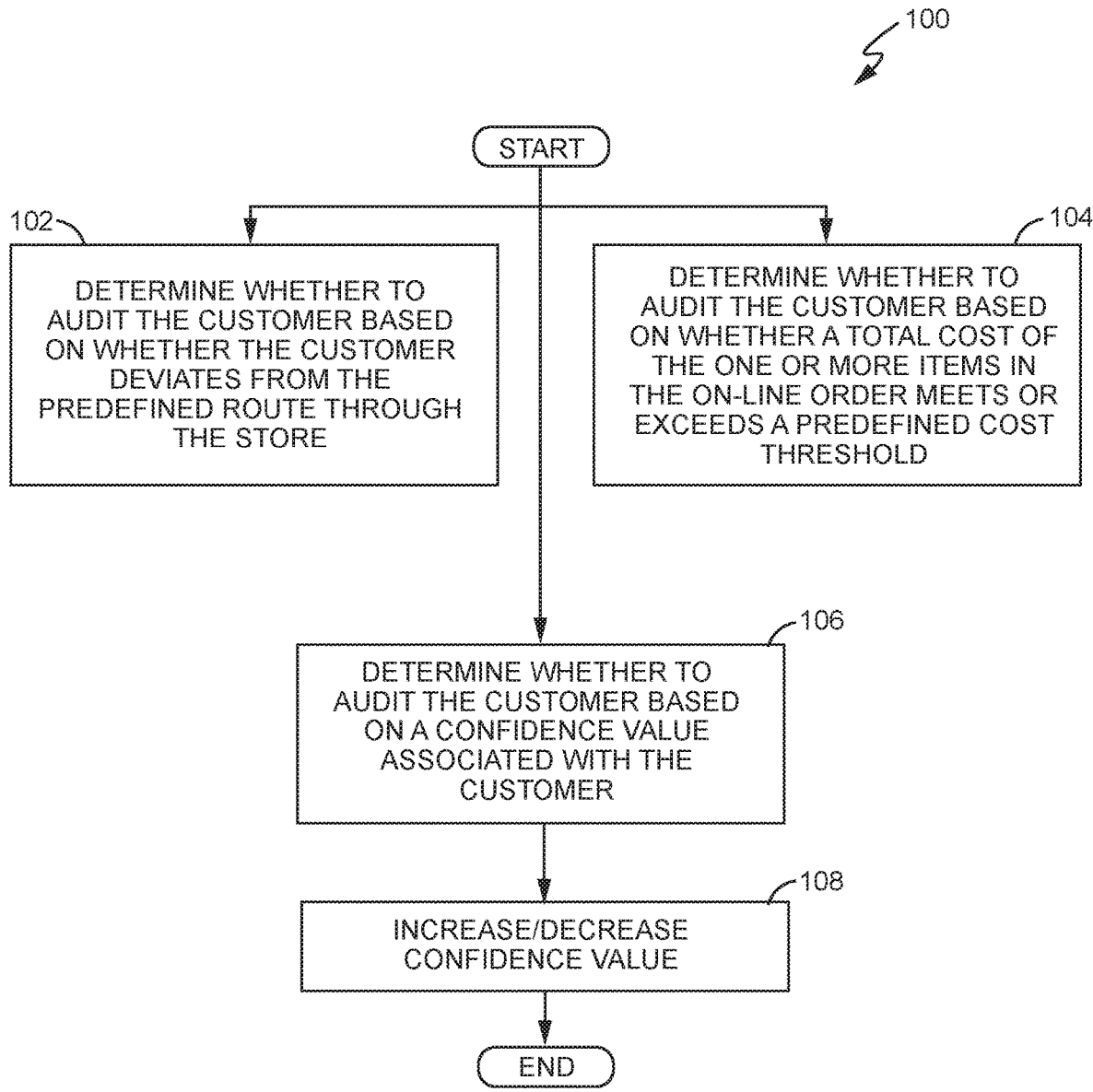
FIG. 5 is a flow chart illustrating other methods of determining whether to audit a customer according to various embodiments of the present disclosure.

Those of ordinary skill in the art should understand that verification based on a customer's location in the store when retrieving a product from the shelving is not the only way in which computer server 20 determines whether or not to audit customers. As seen in method 100 of FIG. 5, for example, there are other ways in which computer server 20 can determine whether or not to audit a customer. For example, as previously described, computer server 20 can be configured to base such decisions on whether the customer deviates from the route R (box 102). In such embodiments, any deviation from the route R can be grounds for an audit. Similarly, other embodiments may decide to audit a customer only after the customer has deviated from route R more than an acceptable number of times (e.g., a predefined threshold value) or responsive to determining that the customer has deviated from rout R for more than a predefined time period. In these latter embodiments, computer server 20 could start a timer responsive to detecting that the customer has deviated from route R, and reset the timer responsive to determining that the customer has returned to following route R.

In another embodiment, computer server 20 can be configured to sum the costs of all the products selected by the customer from the shelves, and determine whether to audit the customer based on whether a total cost of the products selected exceeds an expected cost of the items ordered on-line, or alternatively, a predefined threshold amount (box 104). In some cases, the amount of the cost threshold is different for different customers. For example, customers who are highly trusted by the store (e.g., longtime customers) could have a cost threshold that is higher than a new customer. In another example, the cost thresholds can be based on the amount of money spent at the store by the customer and/or whether the customer is someone who regularly shops at the store, or someone who shops intermittently.

In yet another embodiment, computer server 20 is configured to determine whether to audit a given customer based on a confidence value associated with the customer (box 106). The confidence value is specific to a customer (or alternatively, to a group of customers associated with a "loyalty card"), and represents a level of confidence the store has that a given customer is likely to retrieve only those products that match the items ordered on-line. For example, "trustworthy" customers—e.g., longtime customers who have shown to consistently retrieve only the products that match those items ordered on-line, and/or who spend over a certain amount of money at the store on a relatively regular basis, may have a confidence value that is higher than that of a new customer, or a customer that intermittently spends a relatively little amount of money at the store, or a customer that has been known to deviate from route R when retrieving items ordered on-line.

In this embodiment, the higher the value, the higher level of confidence the store has in the given customer. If the confidence value of a given customer does not meet or exceed a predefined confidence value threshold, computer server 20 will determine that the customer should be audited. The decision to audit the customer may be made despite whether or not the customer deviates from the route R, and/or whether the customer is a longtime customer, and/or the amount of money spent by the given customer. Further, the confidence value of the present disclosure is a dynamic value. Thus, computer server 20 is configured to increase and decrease the confidence value associated with a given customer over time based on whether the customer continually proves himself/herself to be trustworthy (box 108).

Figure 6:
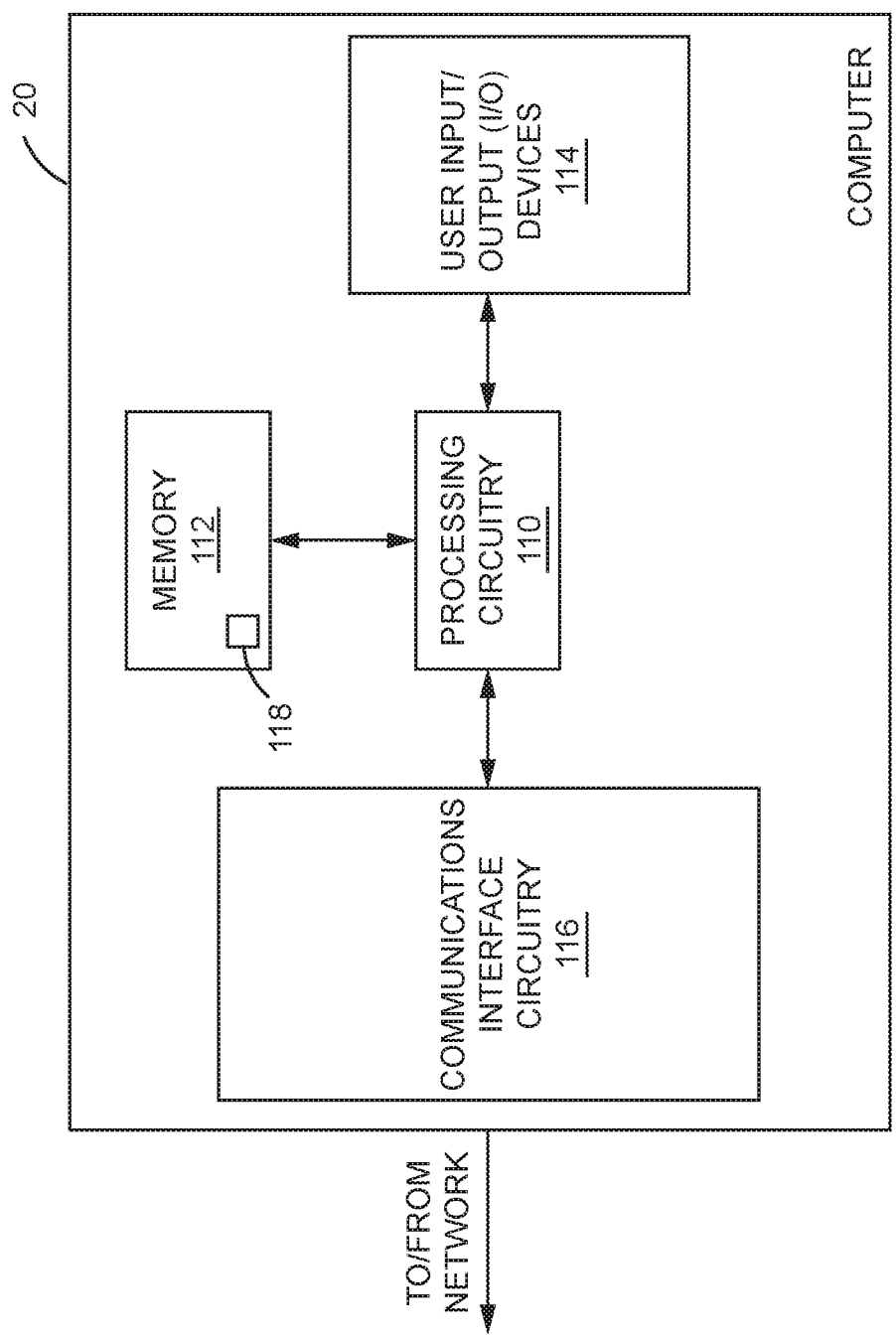
FIG. 6 is a functional block diagram of a computing device configured according to one embodiment of the present disclosure to provide customers with a seamless commerce experience.

FIG. 6 is a block diagram illustrating some functional components of computer server 20 configured according to one embodiment of the present disclosure. As seen in FIG. 6, computer server 20 comprises processing circuitry 110, a memory 112 configured to store a control application 118, user input/output (I/O) devices 114, and communications interface circuitry 116.

Processing circuitry 110, which in some embodiments may comprise a plurality of separate processor circuits, may comprise any sequential state machine operative to execute machine instructions stored as machine-readable computer programs in the memory 112, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above. Processing circuitry 110 is generally configured to control the operations and functions of computer server 20 according to the data and instructions stored in memory 112. This includes being controlled to perform the previously described functions in accordance with the code and logic comprising control application 118.

In particular, according to the present embodiments, processing circuitry 110 is controlled to, inter alia, receive an on-line order for one or more items located in a retail store, identify a customer retrieving the one or more items when the customer enters the store, track the customer's movement through the store as the customer selects one or more products, compare the one or more products selected by the customer to the one or more items identified in the on-line order, determine whether to audit the customer based on a result of the comparison, and transmit a control message to a mobile device of the customer based on the determining. As previously stated, the control message comprises information controlling the customer's mobile device 30 to indicate to the customer whether the customer is to be audited, or whether the customer can bypass auditing and exit the store The memory 112 is operatively connected to processing circuitry 110 and may comprise any non-transitory machine-readable media known in the art. Such media includes, but is not limited to, SRAM, DRAM, DDRAM, ROM, PROM, EPROM, Flash memory, and the like. In one embodiment, memory 112 comprises memory that is positioned on the inside of the computer server 20. In other embodiments, however, it is not. Thus, in at least some embodiments, memory 112 comprises an external database, such as DB 18, communicatively connected to the computer server 20.

The User I/O devices 114 comprise those devices that allow a customer or other user to interact with, and control the operation of, computer server 20 in accordance with the present embodiments. Such devices include, but are not limited to, display devices, including those with a touch-screen), keyboards, keypads, a mouse, and the like.

The communications interface circuitry 116 may comprise, for example, an ETHERNET interface or a wireless interface, such as a WiFi interface operating according to any of the 802.XX protocols. Communications interface circuitry 116 allows computer server 20 to communicate data and messages with remote terminals, such as cameras 14 and the mobile devices of the customers, via IP network 12 using any of a variety of well-known and well-documented protocols, such as UDP and/or TCP/IP, for example. Other communication interfaces not specifically mentioned herein are also possible.

FIG. 7 is a functional block diagram illustrating a non-transitory computer program product configured to control a computer to provide customers with a seamless commerce experience according to one embodiment of the present disclosure. As seen in FIG. 7, the computer program product is executed by processing circuitry 110 and comprises a communications unit/module 120, a customer identification unit/module 122, a customer tracking unit/module 124, a comparison/verification unit/module 126, an audit determination unit/module 128, and a control message generation unit/module 130.

In one embodiment, the communications unit/module 120 is configured to control processing circuitry 110 to receive the on-line orders for one or more products located in a retail store, and to send control messages to the customers' mobile devices 30 indicating whether they should go to an audit station 48, or to a checkout lane 50, or whether they are permitted to bypass both the audit station 48 and the checkout lane 50 and exit the store. In the latter case, communication unit/module 120 is also configured to transmit a request for payment for the products retrieved from the shelves by the customer to the customer's bank, and to send a receipt for the purchase to the customer via email. The customer identification unit/module 122 is configured to identify customers retrieving the one or more products that were ordered on-line when they enters the store. The customer tracking unit/module 124 is configured to track the customers' movements through the store as they select the products from the shelves in the store. The comparison/verification unit/module 126 is configured to verify whether the customers retrieving the products ordered on-line are actually the same products that the customers ordered on-line. The audit determination unit/module 128 is configured to determine whether to audit customers based on the results provided by the comparison/verification unit/module 126. The control message generation unit/module 130 is configured to generate control messages to send to the customers' mobile devices 30 based on the determination made by the audit determination unit/module 128. As previously described, the control messages, when received by a mobile device 30, controls the mobile device 30 to graphically indicate to the customer whether he/she should proceed to audit station 48, checkout lane 50, or whether the customer is permitted to bypass both the audit station 48 and the checkout lane 50 and exit the store.

The present embodiments may, of course, be carried out in other ways than those specifically set forth herein without departing from essential characteristics of the invention. Therefore, the present embodiments are to be considered in all respects as illustrative and not restrictive, and all changes coming within the meaning and equivalency range of the appended claims are intended to be embraced therein.

What is claimed is:

1. A method of fulfilling an on-line order at a physical retail store, the method comprising:
receiving an on-line order prior to a customer entering a retail store for one or more items located in the retail store;
identifying a customer that is associated with the received on-line order and who is authorized to retrieve the one or more items when the customer enters the store;
determining a route through the store for the customer to follow to retrieve the one or more items;
generating a map of the store comprising the route the customer is to follow;
sending the map in a first control message to a mobile device of the customer, wherein the first control message controls the mobile device of the customer to display the map and the route the customer is to follow to retrieve the one or more items;
tracking movement of the customer through the store relative to the route as the customer selects one or more products;
determining whether to audit the customer based on whether the movement of the customer through the store has deviated from the route; and
transmitting a second control message to the mobile device of the customer based on the determination, wherein the second control message comprises information controlling the mobile device to:
indicate to the customer whether the customer is to be audited, or whether the customer can bypass auditing and exit the store; and
graphically direct the customer to an audit station or a checkout lane responsive to determining that the movement of the customer through the store deviated from the route.

2. The method of claim 1 further comprising, for each of the one or more products selected by the customer:
determining a location of the customer in the store when the product is selected; and
verifying whether the product is an item in the on-line order based on the location of the customer when the product was selected.

3. The method of claim 2 further comprising:
verifying that the product is not an item in the on-line order responsive to determining that the location of the customer when the product was selected does not match any predefined locations associated with the one or more items in the on-line order; and
verifying that the product selected by the customer is an item in the on-line order responsive to determining that the location of the customer when the product was selected matches a predefined location associated with at least one item in the on-line order.

4. The method of claim 1 further comprising comparing the one or more products selected by the customer to the one or more items identified in the on-line order, wherein the comparing comprises, for each of the one or more products selected by the customer, comparing a location of the customer in the store when the product is selected to predefined locations associated with the one or more items in the on-line order.

5. The method of claim 4 further comprising determining whether to audit the customer based on a result of the comparing, wherein determining whether to audit the customer based on a result of the comparing comprises:
determining to audit the customer responsive to determining that the location of the customer when the product is selected does not match any of the predefined locations; and
determining to allow the customer to bypass auditing and exit the store responsive to determining that the location of the customer when the product is selected matches the predefined location associated with at least one item in the on-line order.

6. The method of claim 1 further comprising generating the second control message to comprise information controlling the mobile device to graphically direct the customer to a store exit bypassing both the audit station and the checkout lane responsive to verifying that the one or more products selected by the customer is-matches the one or more items in the on-line order.

7. The method of claim 6 wherein the information in the second control message comprises control commands that configure the mobile device to display a graphical indicator graphically directing the customer to the one of the audit station, the checkout lane, and the store exit.

8. The method of claim 1 further comprising determining whether to audit the customer based on a confidence value associated with the customer, wherein the confidence value defines a level of confidence that the customer has retrieved only the one or more items in the on-line order.

9. The method of claim 1 further comprising determining whether to audit the customer based on whether a total cost of the one or more items in the on-line order meets or exceeds a predefined cost threshold.

10. The method of claim 1 further comprising:
establishing a communications link with the mobile device responsive to detecting the mobile device when the customer enters the store; and
identifying the customer based on identification information received from the mobile device.

11. A computer device configured to fulfill an on-line order at a physical retail store, the computer device comprising:
communications circuitry configured to communicate data with one or more remote devices; and
processing circuitry operatively connected to the communications circuitry and configured to:
receive an on-line order prior to a customer entering a retail store for one or more items located in the retail store;
identify a customer that is associated with the received on-line order and who is authorized to retrieve the one or more items when the customer enters the store;
determine a route through the store for the customer to follow to retrieve the one or more items;
generate a map of the store comprising the route the customer is to follow;
send the map in a first control message to a mobile device of the customer, wherein the first control message controls the mobile device of the customer to display the map and the route the customer is to follow to retrieve the one or more items;
track movement of the customer through the store relative to the route as the customer selects one or more products;
determine whether to audit the customer based on whether the movement of the customer through the store has deviated from the route; and
transmit a second control message to the mobile device of the customer based on the determination, wherein the second control message configures the mobile device to:
indicate, to the customer, whether the customer is to be audited, or whether the customer can bypass auditing and exit the store; and
graphically direct the customer to an audit station or a checkout lane responsive to determining that the movement of the customer through the store deviated from the route.

12. The computer device of claim 11 wherein the processing circuitry is further configured to, for each of the one or more products selected by the customer:
determine a location of the customer in the store when the product is selected; and
verify whether the product is an item in the on-line order based on the location of the customer when the product was selected.

13. The computer device of claim 12 wherein the processing circuitry is further configured to:
verify that the product is not an item in the on-line order responsive to determining that the location of the customer when the product was selected does not match any predefined locations associated with the one or more items in the on-line order; and
verify that the product selected by the customer is an item in the on-line order responsive to determining that the location of the customer when the product was selected matches a predefined location associated with at least one item in the on-line order.

14. The computer device of claim 11 wherein, for each of the one or more products selected by the customer, the processing circuitry is further configured to compare a location of the customer in the store when the product is selected to predefined locations associated with the one or more items in the on-line order.

15. The computer device of claim 14 wherein the processing circuitry is further configured to:
determine to audit the customer responsive to determining that the location of the customer when the product is selected does not match any of the predefined locations; and
determine to allow the customer to bypass auditing and exit the store responsive to determining that the location of the customer when the product is selected matches the predefined location associated with at least one item in the on-line order.

16. The computer device of claim 11 wherein the processing circuitry is further configured to
generate the second control message to comprise information controlling the mobile device to graphically direct the customer to a store exit bypassing both the audit station and the checkout lane responsive to verifying that the one or more products selected by the customer matches the one or more items in the on-line order.

17. The computer device of claim 16 wherein the information in the second control message comprises control commands that configure the mobile device to display one or more graphical indicators graphically directing the customer to the one of the audit station, the checkout lane, and the store exit.

18. The computer device of claim 11 wherein the processing circuitry is further configured to determine whether to audit the customer based on a confidence value associated with the customer, wherein the confidence value defines a level of confidence that the customer has retrieved only the one or more items in the on-line order.

19. The computer device of claim 11 wherein the processing circuitry is further configured to determine whether to audit the customer based on whether the customer deviates from a defined route through the store when retrieving the one or more items.

20. A non-transitory computer readable medium comprising a control program stored thereon, the control program comprising instructions that, when executed by processing circuitry of a computing device, causes the computing device to:

receive an on-line order prior to a customer entering a retail store for one or more items located in the retail store;
identify a customer that is associated with the received on-line order and who is authorized to retrieve the one or more items when the customer enters the store;
determine a route through the store for the customer to follow to retrieve the one or more items;
generate a map of the store comprising the route the customer is to follow;
send the map in a first control message to a mobile device of the customer, wherein the first control message controls the mobile device of the customer to display the map and the route the customer is to follow to retrieve the one or more items;
track the movement of the customer through the store relative to the route as the customer selects one or more products;
determine whether to audit the customer based on whether the movement of the customer through the store has deviated from the route; and
transmit a second control message to the mobile device of the customer based on the determination, wherein the control message comprises information controlling the mobile device to:
  indicate to the customer whether the customer is to be audited, or whether the customer can bypass auditing and exit the store; and
  graphically direct the customer to an audit station or a checkout lane responsive to determining that the movement of the customer through the store deviated from the route.

* * * * *